March 27, 1951  R. P. MORK  2,546,771

METAL DETECTOR

Filed Oct. 20, 1949

Inventor:
Raymond P. Mork,
by Paul A. Frank
His Attorney.

Patented Mar. 27, 1951

2,546,771

UNITED STATES PATENT OFFICE 2,546,771

METAL DETECTOR

Raymond P. Mork, Needham, Mass., assignor to General Electric Company, a corporation of New York Application October 20, 1949, Serial No. 122,469

1 Claim. (Cl. 175—183)

My invention relates to the structure of detecting coils used in connection with metal detecting systems.

In the co-pending patent application of Philip C. Michel, Serial No. 681,327, filed July 3, 1946, now Patent No. 2,489,920, granted November 29, 1949, assigned to the same assignee as the present application, there is disclosed a coil arrangement for a metal detecting system comprising a single primary coil and two secondary coils symmetrically positioned within the primary coil and at right angles thereto, the secondary coils being electrically connected so the voltages induced therein are in series opposition. An obstacle encountered in the application of the above-described system is the difficulty in mounting the coils rigidly to prevent changes in the relative positions of the primary and secondary coils which unbalance the system and result in output voltages sufficient to operate the relay mechanism. In addition, the primary coil completely encircles a metal conveying belt which necessitates cutting the belt to install the detecting system.

It is, therefore, an object of my invention to provide a composite coil structure for use in connection with metal detecting systems which facilitates rigid mounting and does not encircle the conveyor belt.

It is another object of my invention to provide a composite coil structure for use in connection with metal detecting systems in which the effect on the system of changes in the relative positions of the component coil units is reduced to a minimum.

In accordance with my invention, I provide two coil units, each comprising a primary and a secondary winding and having the axes of the primary and secondary windings of each unit mutually perpendicular. The two coil units are mounted in such a manner that the axes of the two secondary coils are in substantial alignment and the space between the coil units is such as to permit the passage of material to be examined.

Figure 1:
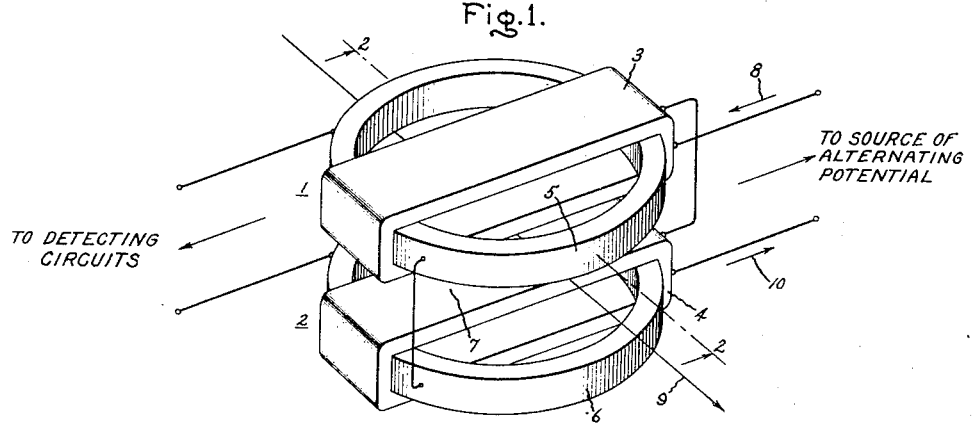
Figure 2:
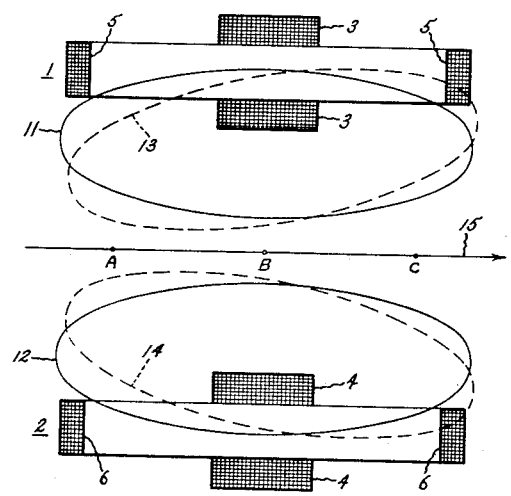
Figure 3:
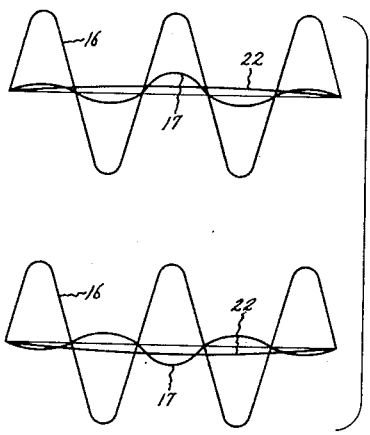
Figure 4:
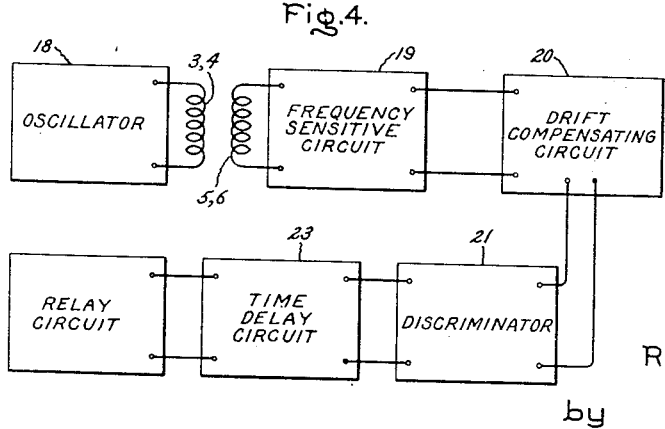

The features of my invention which I believe to be novel are set forth with particularity in the appended claim. My invention itself, however, both as to its organization and methods of operation, together with further objects and advantages thereof, may be best understood by reference to the following description taken in connection with the accompanying drawings in which Fig. 1 represents the composite coil structure of my invention; Fig. 2 is a cross-sectional view along the line 2—2 of the coil structure illustrated in Fig. 1; Fig. 3 shows the relationship between the voltages across the primary and secondary windings and the output voltage of a discriminator circuit employed in a metal detecting system; and Fig. 4 is a block diagram of an entire metal detecting circuit.

Referring particularly to Fig. 1, there is shown a composite coil structure employed in a metal detecting system and comprising two coil units designated by the numerals 1 and 2, and including secondary windings 5, 6 which are circumscribed by primary windings 3, 4. The axes of primary windings 3, 4 are perpendicular to the axes of secondary windings 5, 6, respectively, and are positioned symmetrically thereto. The coil units are mounted with the axes of the secondary windings in substantial alignment and with an intervening space between the units sufficient for passage of material to be examined. The primary windings 3, 4 are electrically connected in series in such a manner that the magnetic fields produced by the windings in the detecting gap 7 are additive. The terminals of the series combination of primary windings 3, 4 are connected to a source of alternating potential (not shown) of substantially constant voltage and frequency.

Assuming the current is flowing inward in the upper potential lead, as indicated by an arrow 8, the direction of the magnetic field produced by winding 3 in the detecting gap 7 is indicated by an arrow 9. Since the current in the lower potential lead is flowing outward, as indicated by the arrow 10, the direction of the magnetic field in the detecting gap 7 produced by the primary winding 4 is also in the direction of the arrow 9, and, hence, the total magnetic field existing in the detecting gap 7 is the sum of the magnetic fields produced by the primary windings 3, 4. Similarly, when the current reverses, the direction of the magnetic field in the detecting gap 7 reverses.

The operation of the metal detecting structure illustrated in Fig. 1 may be best explained by reference to Fig. 2, which is a cross-sectional view along the line 2—2 of the composite structure shown in Fig. 1. The lines 11 and 12 represent a series of symmetrical flux lines which exist about the primary windings 3 and 4 when the magnetic field is undistorted. The lines 13 and 14 represent a series of distorted flux lines caused by the introduction of a magnetic material into the working gap 7. When the path of the flux is undistorted, the flux linkages of lines 11 and 12 are zero and no voltage is induced in the secondary coils 5 and 6. Furthermore, it has been found that relative movement between the structures 1 and 2 has little or no effect on the sum of the voltages induced in the secondary windings 5 and 6, or, in other words, the effect of the flux of primary winding 3 on the secondary winding 6 is balanced by the effect of the flux of primary winding 4 on the secondary winding 5. With the introduction into the detecting gap 7 of the magnetic material, the magnetic fields of primary windings 3 and 4 are distorted, as represented by the lines 13 and 14. The flux linkages of lines 13 and 14 and, hence, the voltages induced in the secondary windings 5 and 6 depend on the amount of distortion in these magnetic fields. Since secondary windings 5 and 6 are electrically connected in such manner that the voltages induced therein are additive, the total output voltage supplied to the detector is the sum of the voltages induced in coils 5 and 6. The total voltage so induced in the secondary windings 5 and 6 will be either in phase or out of phase with the alternating source voltage, depending on the direction of distortion of the flux lines and the losses resulting from eddy currents, hysteresis losses, etc. in the material in the detecting gap 7. For descriptive analysis, the total voltage induced in the secondary windings 5, 6, when a magnetic material enters the detecting gap 7 from the left, as shown in Fig. 2, will be treated as in phase with the oscillator voltage. As the material follows a path indicated by an arrow 15, the voltages induced in the secondary windings increase from zero to a maximum value at point A and again decrease to zero as the particle approaches position B directly between the primary windings 3 and 4. In position B, the distortion of the flux pattern is symmetrical with respect to a vertical and, hence, no voltage is induced in the secondary windings 5 and 6; but, as the material passes to the right of position B, the distorted flux of windings 3 and 4 induces a total voltage in the secondary windings 5 and 6 which is opposite in polarity to the voltage induced when the magnetic material was in position A.

This change in polarity, or phase, is best illustrated by Fig. 3, in which curve 16 is the sinusoidal variation of the alternating source voltage and curve 17 is the total voltage induced in the secondary windings 5 and 6. The magnitude of the voltage of curve 17 varies due to the change in position of the magnetic material and the consequent change in the amount of distortion of the magnetic field. As shown in the upper portion of Fig. 3, curve 17 represents the total voltage induced in the secondary windings 5 and 6 when a magnetic material is to the left of position B. As shown in the lower portion of Fig. 3, curve 17 represents the total voltage induced in the secondary windings 5 and 6 when a magnetic material is to the right of position B. In the latter position, the total voltage induced in the secondary windings 5 and 6 is 180° out of phase with the alternating source voltage, due to the change in direction of the distortion of the magnetic field.

Fig. 4 illustrates the electrical connections of the detecting coils and detector circuit of the type described in the above-mentioned co-pending application of Philip C. Michel. In such detecting circuit, an oscillator 18 supplies an alternating voltage to the primary windings 3 and 4. Depending on the position of the magnetic particle and the concomitant distortion of the magnetic field of the primary windings 3 and 4, a voltage is induced in the secondary windings 5 and 6. This voltage so induced in the secondary windings 5 and 6 is shown by curve 17 of Fig. 3 and is supplied to a frequency-sensitive circuit 19 which eliminates all external frequencies which may have been induced in the circuit. A drift compensating circuit 20 corrects errors caused by slow drift of the detector system to an unbalanced condition due to causes other than presence of metallic materials in the working gap 7, such as the collection of magnetic dust, etc. A discriminator circuit 21, which is sensitive to both the magnitude and phase relationships (with reference to the oscillator voltage) of the secondary voltage, supplies a voltage 22 to a time delay circuit 23. This voltage 22 is positive when the oscillator and secondary voltages are in phase and negative when they are 180° out of phase. The time delay circuit 23 permits operation of the relay circuit only when two signals appear at time intervals, such as caused by movement of a magnetic material through the detecting coil at the rated speed.

While the present invention has been described by reference to particular embodiments thereof, it will be understood that numerous modifications may be made by those skilled in the art without actually departing from the invention. I, therefore, aim in the appended claim to cover all such equivalent variations as come within the true spirit and scope of the foregoing disclosure.

What I claim as new and desire to secure by Letters Patent of the United States is:

In apparatus for detecting metallic objects in non-metallic material, the combination comprising a pair of series connected secondary coils positioned with their radii in substantially parallel planes adjacent to such material and on opposite sides thereof, a first primary coil diametrically encircling only one of said secondary coils, a second primary coil diametrically encircling only the other of said secondary coils, neither of said primary coils encircling such material, and a source of alternating current connected to energize said primary coils with such polarities that their magnetic fluxes are additive through such material, said secondary coils being connected in series bucking relation to produce a zero resultant output voltage across said secondary coils when the magnetic field of said primary coils is undistorted.

RAYMOND P. MORK.

REFERENCES CITED

The following references are of record in the file of this patent:

UNITED STATES PATENTS

| Number | Name | Date |
| --- | --- | --- |
| Re. 15,859 | Burrows | June 17, 1924 |
| 2,477,057 | Grady | July 26, 1949 |

OTHER REFERENCES

Dept. of Interior Information Circular 6854, Oct. 1935, page 13 and Figs. 14 and 15, by Joyce.